(12) United States Patent
Couronné et al.

(10) Patent No.: US 7,139,582 B2
(45) Date of Patent: Nov. 21, 2006

(54) METHOD FOR THE CONTINUOUS REAL TIME TRACKING OF THE POSITION OF AT LEAST ONE MOBILE OBJECT AS WELL AS AN ASSOCIATED DEVICE

(75) Inventors: Sylvia Couronné, Erlangen (DE); Marcus Bliesze, Erlangen (DE); Günter Hofmann, Litzendorf (DE); Ernst Eberlein, Grossenseebad (DE); Stefan Koehler, Rödental (DE); Thomas Von Der Grün, Kleinsendelbach (DE); Marco Breiling, Erlangen (DE); Reiner Retkowski, Erlangen (DE)

(73) Assignee: Fraunhofer-Gesellschaft zur Förderlung der Angewandten Forschung E.V., Munich (DE)

( * ) Notice: Subject to any disclaimer, the term of this patent is extended or adjusted under 35 U.S.C. 154(b) by 219 days.

(21) Appl. No.: 10/693,631

(22) Filed: Oct. 27, 2003

(65) Prior Publication Data

US 2004/0171388 A1    Sep. 2, 2004

(30) Foreign Application Priority Data

Oct. 28, 2002   (DE)   ................. 102 50 243
Oct. 29, 2002   (DE)   ................. 102 50 500
Nov. 14, 2002   (DE)   ................. 102 52 934

(51) Int. Cl.
*H04Q 7/20*   (2006.01)

(52) U.S. Cl. ................. 455/456.1; 455/456.2; 455/456.3; 455/456.5; 455/456.6; 455/450; 455/455; 370/319; 370/320; 370/321; 342/453; 342/463

(58) Field of Classification Search ..... 455/456.1–457, 455/450–453, 455; 370/319, 320, 321, 322, 370/324, 326; 342/453, 457, 463
See application file for complete search history.

(56) References Cited

U.S. PATENT DOCUMENTS 3,782,730 A  *  1/1974  Horchler .................... 473/353
4,660,039 A     4/1987  Barricks et al.
5,150,310 A     9/1992  Greenspun et al.
5,477,459 A  *  12/1995  Clegg et al. ................. 701/300

(Continued)

FOREIGN PATENT DOCUMENTS

EP         0 514 511         11/1992

(Continued)

*Primary Examiner*—Steve M. D'Agosta
(74) *Attorney, Agent, or Firm*—Rabin & Berdo P.C.

(57) ABSTRACT

In a method for the continuous real time tracking of the position of at least one mobile object in a defined multidimensional space, at least one mobile transmitter module is attached to at least one mobile object and the signals from the at least one module are received by a stationary receiving and signal processing network and then centrally processed. The signals emitted by each transmitter module are electromagnetic waves sent within a frequency band range using time division multiplexing techniques. Due to the fact that the frequency band is used as a single channel for the purpose of maximizing the accuracy with which a position is detected, and due also to the fact that the communication process between the transmitters and the receivers is based on the principle of pseudo-random time division multiplexing using burst transmissions of low cross correlation with non synchronized pseudo-random patterns, there is created a method for the continuous tracking of the position of one or more mobile objects at any time and in any place which is of very high positional resolution and has a temporal resolution of just a few milliseconds.

21 Claims, 6 Drawing Sheets

U.S. PATENT DOCUMENTS

| | | | |
|---|---|---|---|
| 5,485,163 A * | 1/1996 | Singer et al. | 342/457 |
| 5,513,854 A | 5/1996 | Daver | |
| 5,583,517 A * | 12/1996 | Yokev et al. | 342/457 |
| 5,600,706 A * | 2/1997 | Dunn et al. | 455/456.2 |
| 5,912,644 A * | 6/1999 | Wang | 342/457 |
| 5,926,133 A * | 7/1999 | Green, Jr. | 342/363 |
| 6,041,046 A * | 3/2000 | Scott et al. | 370/319 |
| 6,204,813 B1 * | 3/2001 | Wadell et al. | 342/463 |
| 6,831,603 B1 * | 12/2004 | Menache | 342/463 |
| 2002/0196186 A1 * | 12/2002 | Holt | 342/453 |

FOREIGN PATENT DOCUMENTS

| | | |
|---|---|---|
| EP | 0514511 B1 | 2/1996 |
| EP | 0 700 525 | 3/1996 |
| EP | EP 0700525 B1 | 4/1998 |
| EP | 0880721 B1 | 12/2001 |

* cited by examiner

METHOD FOR THE CONTINUOUS REAL TIME TRACKING OF THE POSITION OF AT LEAST ONE MOBILE OBJECT AS WELL AS AN ASSOCIATED DEVICE

CROSS-REFERENCE TO RELATED APPLICATIONS

The invention relates to methods for the continuous real time tracking of the position of at least one mobile object in a defined multidimensional space, and also to an associated apparatus.

FIELD OF THE INVENTION

The invention relates to methods for the continuous real time tracking of the position of at least one mobile object in a defined multidimensional space in accordance with the first part of claim 1 and also to an appertaining device in accordance with the first part of claim 20.

STATE OF THE ART

For quite some time now, various interest groups have expressed the desire for a system enabling them to study or reconstruct the path followed by moving objects or persons, this presupposing an accurate indication of the position of the object both locally and temporally. Amongst other things, balls in play are of especial interest particularly in commercialized types of sport, such as rapidly accelerating footballs in a three-dimensional space, and likewise, tennis or golf balls. Thus, the question as to who last touched the object in play, how it was hit and in which direction it was further-accelerated can, in dependence on the type of game, be crucial for the outcome of the game. Meanwhile, the equipment used for the game and employed in high performance sports (e.g. tennis balls, golf balls, footballs and the like) can now be accelerated to extremely high speeds so that the detection of the object during the movement thereof requires highly sophisticated techniques. The technical means used so far —predominantly cameras—do not meet the demands outlined above or they do so to only a limited extent; in addition, the methods known until now for determining the position of an object by utilizing different combinations of transmitters and receivers still leave a large margin of error with regard to the spatial resolution of the positional indications, with regard to the handling of the necessary transmitter/receiver components and, above all, with regard to the evaluation of the data received by the transmitter/receiver system so that, in consequence, extremely fast evaluation of the results obtained from this data is not yet possible.

A system for the localization of a mobile object in a predefined area is described in EP 700 525 B1. In concrete terms, it is concerned with the determination of the position of cellular telephones, whereby however, the areas must be spaced from each other by at least 0.5 to 20 miles. The main problem with the navigation of these telephones is that the navigation process should use as little of the available capacity as possible since this capacity is otherwise needed for the accomplishment of the primary tasks of such telephones, namely, speech transmission. In the case of cellular telephones, the transmitters share the same frequency according to the TDMA principle, this presupposing however that the transmitters are synchronized or initialized, so that interference between the transmitted signals does not ensue here. As a result, boundary conditions arise for this technique which are basically different from those required for mastering the task of detecting the position of a ball in play in a field of just a few square meters in size. Here, the main point of interest lies in the provision of a system of high accuracy which is so robust that it is capable of being moved in a highly accelerated object that is in play. One can therefore exclude the possibility of scaling the technology disclosed in EP 700 525 B1 so as to match the field of application envisaged here since it would not lead to an increase in the accuracy, especially in a three-dimensional space, of a system that must be simultaneously robust.

EP 514 511 B1 also describes a system for determining the position of radio telephones, although on the basis of alternative criteria, in the context of a method for the transference of speech in a cellular mobile radio telephone system. This document focuses on locating cells which fulfill a special standard in accord with a criterion for the level of a radio signal and to which the selected cell should be transferred. Here too, use is made of a very rapidly occurring transmission of an electromagnetic wave, a so-called burst transmission. Basically, the problem involved there, for reason of which the technique disclosed in this document is not suitable for the problem-solution process applicable to the centimeter-exact detection of a ball in play in a field, is the same as was stated in connection with EP 700 525 B1.

In a document by E. Kramar: "Funksysteme für Ortung und Navigation," 1973, published by Berliner Union GmbH Stuttgart, pages 91–92, it is mentioned that straight receivers are used as position locating receivers e.g. for the Omega system, for the purposes of determining the position of a mobile object.

A description is given in DE 44 09 178 A1 of the basic principle involved in the use of transit time measurements for the determination of position. This is not helpful however for solving the task of continuous real time tracking of the position of a mobile object in a defined multidimensional space in the case where we are concerned with an increase in accuracy.

A TDMA system that comprises a plurality of user stations which communicate with a base station is described in U.S. Pat. No. 6,041,046. To this end, pulsed transmissions are likewise sent out. However, there is no starting point in this document which would assist with solving the problem of continuously tracking the position of a mobile object in real time, in particular a ball in play, in a defined multidimensional space such as a playing field.

DE 200 04 174 U1 discloses gaming equipment, in particular a ball, having a transmitter installed in the interior thereof. The technique used in this system is based on the reflection of electromagnetic waves between transmitters and receivers and is not suitable for solving the stated problem; the sending and receiving elements utilized in this technique are equipped for communication by means of a reflection process.

A system for determining position is likewise described in EP 0 880 712 B1. It is likewise not suitable for the determination of the position of a moving object to within a range of centimeters in real time.

The other prior techniques specified below are also known in the context of navigation or position-detecting systems, but they are not suitable for the aforementioned field of application since they are either not suitable in an environment subject to reflections and absorption or the indication of the position is dependent on the receiving conditions and cannot be produced with sufficient accuracy for the aforementioned applications.

Appertaining hereto are:

GPS type systems: A mobile receiver simultaneously receives the signals from at least 3 transmitters; the receiver can determine its position from the differences in the "Time Of Arrival" (TOA). For the above mentioned type of application, each receiver would have to be equipped with a transmitter which continuously transmits the position thereof to a central computer. In addition, the entire navigational computation is accomplished in the mobile transceiver modules, this therefore corresponding to a complex signal processing system involving high computing power and a vary large amount of storage capacity. Such a system is disclosed in U.S. Pat. No. 5,438,518. In order to ensure greater accuracy in regard to the position, signal characteristics relating to the field under observation are additionally stored centrally in digital fashion and the signal characteristics of the received signal are correlated with the stored information. The disadvantage here, is the substantial and virtually unfeasible miniaturization of the system (see also DE 100 53 959 A1, WO 02/037134 A).

Radar systems: Transit time measurements using (active) transponders or tags. A transmitter at the edge of the playing field sends out a pulse which is received by the moving object and this sends back an echo after a certain time. The distance between the transmitter and the moving object can then be determined from the total transit time of the signal. In this regard, see U.S. Pat. No. 4,660,039. Simultaneous tracking of many objects with a high level of temporal resolution is very difficult using this technique.

Directional antennae: The moving objects are tracked by very highly directional antennae, whereby they send out signals which are aligned on the receiving antennae. If at least two antennae are used, then the position can be determined from the angles of alignment of the antennae. This principle is described in U.S. Pat. No. 5,513,854 for locating the position of athletes on a playing field. U.S. Pat. No. 5,583,517 describes a system which is based on the same principle, wherein the mobile transmitter spreads the signal over many different carriers and the resulting signals are recombined in the receiver in order to be resistant to multipath propagation. The disadvantage here is that a suitable resolution is only obtained if extremely high frequencies (−>light) are used.

Optical systems: The objects are tracked by several cameras. The tracking process itself can be effected automatically by an image processing system (pattern recognition) or by means of electromagnetic techniques (magnetic sensors). The position can be calculated by evaluating the image. Problem: Optical systems can only determine the position if the objects are not obscured by obstacles. In addition, the location detecting process cannot presently be evaluated automatically and on-line.

Field strength measurements on the basis of skiffs or the like: A very large number of receivers (or transmitters) ("skiffs") are distributed over the playing field. The field strength of the signal corresponds to the distance between the skiffs and the moving object. The position can then be calculated from the field strengths. It is disadvantageous that a very large number of skiffs must be installed in order to obtain a high resolution.

A method as well as a device for determining the position, the orientation and/or the distortion of an object are known from DE 100 54 282 A1, wherein one or more signal generators are arranged on the object and send out electromagnetic signals. The control of the signal generators is effected in such a manner that the individual signals therefrom are mutually distinguishable. They are projected onto at least one two-dimensional-resolving location detector (PSD), converted there into two-dimensional position coordinates and then converted into information relating to the position, the orientation and/or the distortion of the object. The system is extremely complex but nevertheless, works essentially only in two dimensions.

SUMMARY OF THE INVENTION

The object of the invention is to provide a method for the continuous real time tracking of the position of at least one mobile object in a defined three-dimensional space with very high positional resolution and a temporal resolution of just a few milliseconds for the purpose of continuously tracking the position of one or more mobile objects and/or persons at any time and in any place.

This object can be attained by providing a method and apparatus for the continuous real time tracking of the position of at least one mobile object in a defined multidimensional space, wherein at least one mobile transmitter module which is attached to at least one mobile object of the system that is to be analyzed and whose signals are received by a stationary receiving and signal processing network and are processed centrally, wherein the signals emitted by the at least one transmitter module are electromagnetic waves which are transmitted within a frequency band range utilizing a time division multiplex technique, and wherein the method and apparatus are characterized in that the available frequency band is used as a single channel for the purposes of maximizing the accuracy of the position detecting process, and in that the communication process between the transmitters (S, Sp, Sb) and the receivers ($E_1, \ldots, E_n$) is based on the principle of pseudo-random time division multiplex using non synchronized pseudo-random patterns, and in that the transmission signals in the different burst transmissions (B) are characterized by a low cross correlation.

The use of the frequency band as the only channel, this being tantamount to saying that all of the transmitters use the same band, makes it possible to use a higher data transmission rate and thus sampling rate for increasing the positional resolution and temporal resolution which is necessary in order to detect objects having speeds of up to even e.g. 150 km/h. Consequently, an available bandwidth of a frequency band is used for the communication process between the transmitter and the receiver for the purposes of achieving maximum accuracy. Nevertheless, the components of the system embodied in the invention should be robust, compact and capable of being handled in a practical manner, of as small a size as possible and, in addition, be resistant to e.g. mechanical impacts or chemical effects such as e.g. body sweat. Another goal is to integrate these components in a ball. In order to achieve this goal, the communication process between the transmitters and the receivers (E1, . . . , En) is effected by the principle of pseudo-random time division multiplex using burst transmissions (B) of low cross correlation and non synchronized pseudo-random patterns. In particular, the non synchronized communication process permits of a more robust construction especially of the most heavily loaded transmitters since all the components that are needed for synchronizing purposes in the state of the art can be dispensed with. In combination, pseudo-random time division multiplex and non synchronized pseudo-random patterns significantly increase the accuracy of the locating process for the avoidance of the multi-path transmission effect. However, if a plurality of transmitters are needed in order to detect the players and the ball, e.g. about 100 transmitters are required for a football match, then the resulting amount of data can only be detected and transmitted with the appropriate degree of accuracy in this way.

We are thus concerned with a wireless, radio-based system that consists of mobile transmitter modules which are attached to the mobile objects in the system being analyzed, and the signals therefrom are received by a fixed receiving and signal processing network and are centrally processed.

It is of particular significance that the communication process between the transmitters and the receivers is implemented by the mechanism of pseudo-random time division multiplex using burst transmissions of low cross correlation and non synchronized pseudo-random patterns, which can be understood as e.g. a combination of the access mechanisms, time division multiplex and code division multiplex. In the case of time division multiplex (TDMA) (c.f. U.S. Pat. No. 6,204,813), the transmitters on the moving objects transmit in time division multiplex so that each transmitter must also contain a receiver which makes a synchronizing pulse available to the transmitter, from which the time point of the burst transmission is then derived. Each transmitter uses a different pseudo-random sequence for the transmitting time point so that different transmitters will always be superimposed or no superimposition will occur at other time points. TDMA thus uses a very uniform pattern which has the same period for the individual transmitters and also synchronizes the periods. By means of a "phase shift" of the periods, one then achieves the effect that the transmitters will never send at the same time. However, that again presupposes that the transmitters are synchronized. In the case of code division multiplex (CDMA), orthogonal spreading sequences are used for the transmitters so that the transmitters do not have to be synchronized. In the event that the transmitters are at different distances however, the signal from the more distant transmitter is over-laid by that from the closer one.

The utilization of non synchronized pseudo-random patterns simplifies the design of the transmitters since a receiver for receiving a synchronizing pulse is not needed. However, there is a shift of the random patterns towards one another as a result of omitting the synchronization process, this making it more difficult to maintain the condition that as few transmitters as possible should be active at the same time since all the transmitters are using the same band; i.e. finding suitable random sequences is made more difficult. This problem of interference between the transmitted signals that occurs in the case of non synchronized transmitters does not arise with mobile telephones since the signal transmissions are initialized (=synchronized). In accordance with the invention however, this problem is solved by the use of sequences of low cross correlation which enable the signals to be separated by means of the identification sequence of the transmitter, this corresponding to a certain part of the burst transmission, in the event of the actual occurrence of at least two transmitters transmitting a signal at the same time. Due to the high pulse rate, the system can easily function without some individual values if these cannot be detected. Thus, in toto, high capacities of the system can be used for the transmission of signals for the navigation process.

The accuracy can be further increased, if synchronization of the pseudo-random patterns is integrated in the system by means of a receiver module in the transmitter in order to reduce the likelihood of superimposition when many transmitters are being used.

All the items of transmitter-receiver data are preferably captured and stored. Consequently, subsequent processing can be effected on the basis of the stored data should this be necessary in order to utilize more exact algorithms corresponding to particular e.g. decision-pertinent situations.

BRIEF DESCRIPTION OF THE DRAWINGS

The invention will be explained in more detail hereinafter with the aid of the accompanying Figures. Therein.

DETAILED DESCRIPTION OF PREFERRED EXEMPLARY EMBODIMENTS

The invention will now be explained in more detail in exemplarily manner with reference to the accompanying drawings. However, the exemplary embodiments are merely examples which are not intended to restrict the inventive concept to a certain arrangement.

Figure 1:
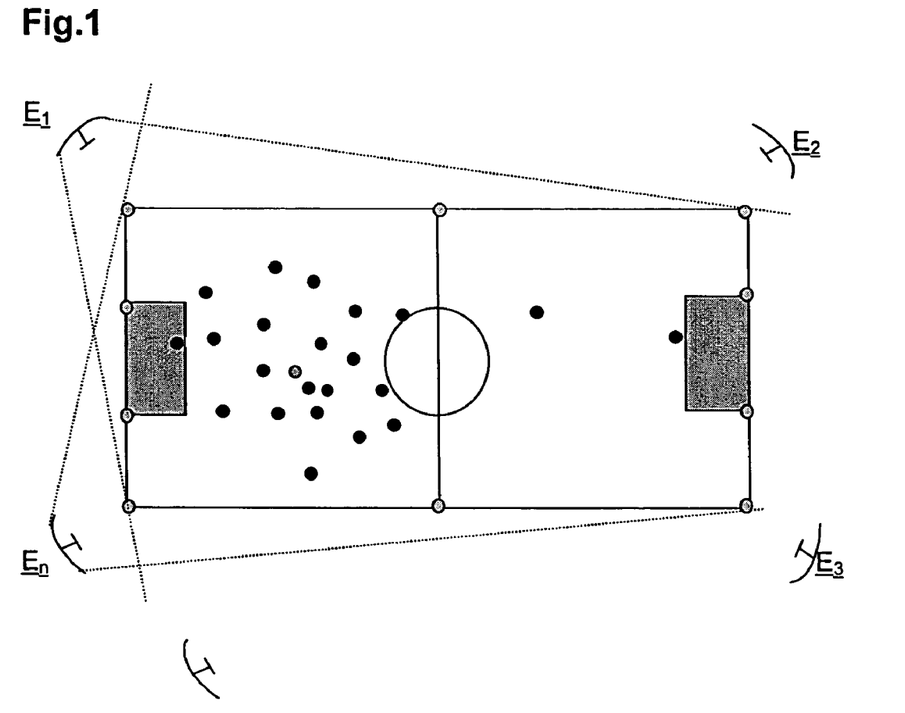
FIG. 1 shows a schematic plan view of a playing field with receivers and transmitters.

A method for the continuous real time tracking of the position of at least one mobile object in a defined multidimensional, here three-dimensional, space is portrayed in the Figures. A mobile object in the form of a game object, here a football (that is, a soccer ball), which is characterized by its transmitter Sb and also players, who are characterized by their transmitters Sp, are illustrated in FIG. 1. Although the method is explained hereinafter on the basis of the mobile objects being in the form of a football and the players in a football match, it should be pointed out that other areas of application are nevertheless conceivable wherein one is concerned with the detection of moving objects with high positional accuracy and temporal resolution, i.e. with the detection of highly dynamic paths of movement. A restriction to the field of application in sport is not to be construed from the following explanation.

Now firstly, the at least one mobile object may be the transmitter Sb in the football if we are only concerned with detecting the movement of the football. However, for the purpose of evaluating the course of play or studying the movement of the players, it is more meaningful if the players themselves are also included as mobile objects, e.g. by arranging transmitters Sp in their shin guards in order to be able to detect the movement and the direction of movement of the players. Thus, statistically evaluable data e.g. in regard to the paths of the players or the speed of the players and the ball will be readily available. For example, a calculation could be made as to e.g. how closely the ball missed the goal. Even new forms of video game could be developed on the basis of this data. Furthermore, assistance could be provided for optimizing the playing tactics and training concepts. Since the data is player-specific, objective performance data banks or a personal training concept could also be established. Moreover, the properties of the playing equipment could also be more closely observed and optimized.

The consequence of all this is that an extensive network will be required e.g. a network consisting of 8 receivers E, $E_1$–$E_n$, forming a receiver network RN, and the transit time data from up to 100 transmitters S, Sb, Sp, S1–S6 needs to be collected.

Furthermore, reference transmitters $R_1$ to $R_n$ are required in order to e.g. calibrate the infrastructure. Since the mobile object, here e.g. the football, can move at speeds of up to 150 km/h, a burst transmission having a high repetition rate of 0.5 ms, which corresponds to a positional resolution of 2 cm in the case of a ball moving at 150 km/h, is necessary at least for the ball transmitter. This burst transmission contains all of the data necessary for the processes of identifying and locating the position of the transmitter, as will subsequently be discussed. The system is thereby capable of high accuracy in real time so that a continuous near-time supply of data e.g. for assisting the referee and for television pictures now becomes possible. The final decision will, however, be left to the referee.

The transmission of the data preferably takes place in the frequency band range of 2.4 GHz, whereby the bandwidth of 80 MHz is preferably used as the only channel for the purposes of maximizing the positional accuracy. To this end, there is attached to the mobile object a mobile transmitter module whose signals are received by a stationary receiving and signal processing network and then centrally processed. The signals emitted by the transmitter module are electromagnetic waves sent in time division multiplex. For the purposes of increasing the transmission options and the positional accuracy, communications between the transmitters S, Sp, Sb and the receivers $E_1$–$E_n$ are effected on the principle of pseudo-random time division multiplex using burst transmissions B of low cross correlation and non synchronized pseudo-random patterns. The positional accuracy can also be improved by storing the relevant raw data and using it suitably adapted in navigation algorithms. Due to the storage process, it is possible to improve the accuracy e.g. by an iterative process or to analyze the data of special interest e.g. a goal shot, using more complex algorithms.

Figure 4:
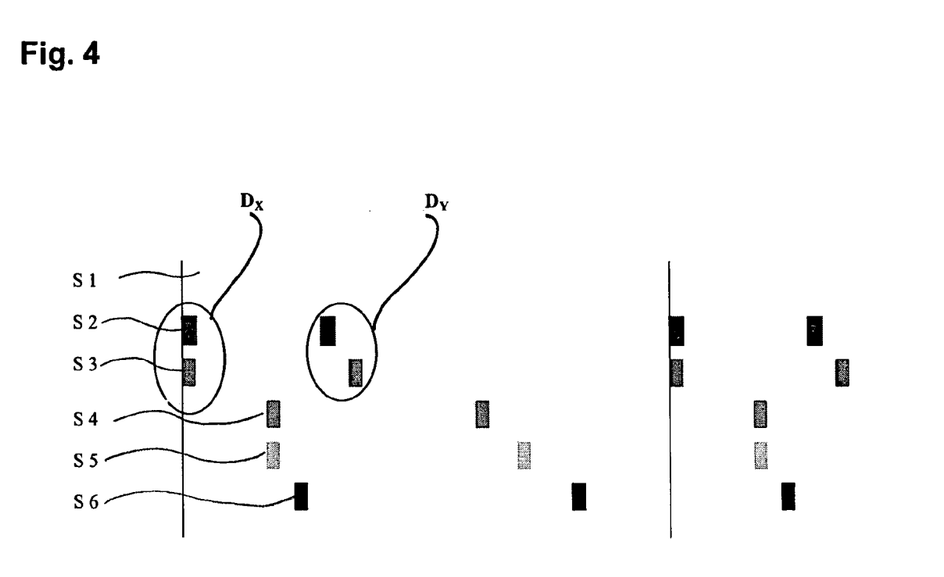
FIG. 4 illustrates a transmission sequence from different transmitters.
Figure 5:
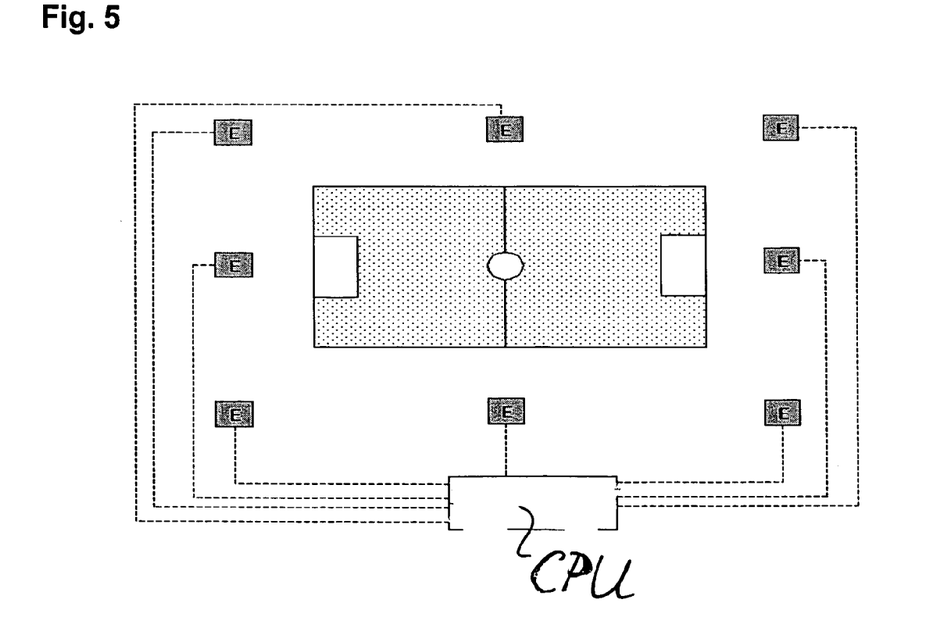
FIG. 5 is an illustration of the arrangement of the receivers.

In order to obtain a high positional resolution corresponding to a high level of accuracy in the transit time measurement, a signal having as high a bandwidth as possible is used. However, as the available bandwidth is limited, the transmitters must share the available spectrum according to the code division multiplex and the time division multiplex principles. Since the receiving time is preferably non synchronized, the transmitters send at random or at pseudo-random scattered time points; the sequences of these transmitting time points are not synchronized—in contrast to the exclusive employment of TDMA. Each transmitter uses a different pseudo-random sequence for the transmitting time point so that different transmitters are always superimposed or there is no superimposition at other time points. Random superimpositions can be accepted, as is particularly clear from FIG. 4. In accordance with detail $D_X$, the transmitters S2, S3 send at the same time, whilst they send in time shifted manner in accordance with detail $D_Y$. Multiple superimpositions of this type may occur but, due to the appropriate sampling rate, they are acceptable as favoring the increased robustness of the transmitters and their compact construction. Due to the fact that the available bandwidth per transmitter determines the accuracy, each of the transmitters shares the same frequency and so the full bandwidth is available for each transmitter. The combination of "each of the transmitters use the same band" and "the transmitters are not synchronized" simultaneously leads to the desired accuracy and robustness of the system.

Figure 3:
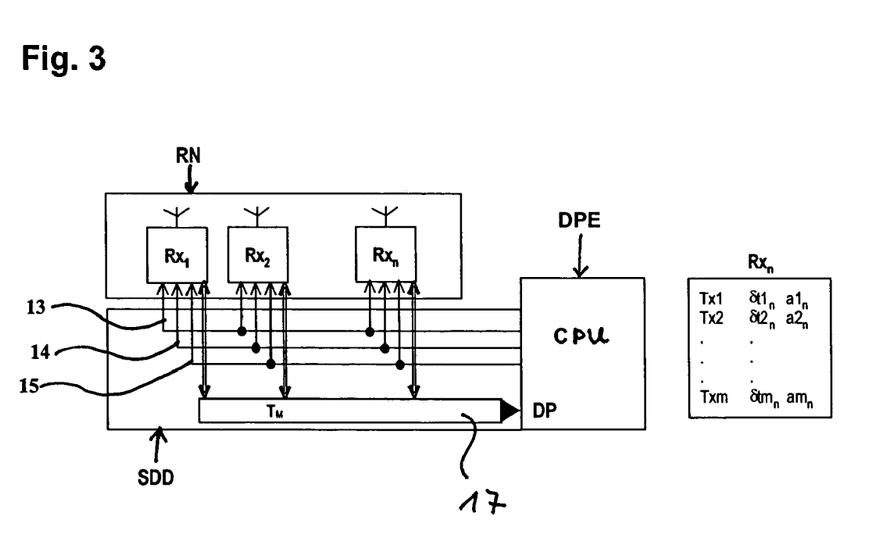
FIG. 3 is a block diagram of a receiver network.
Figure 6:
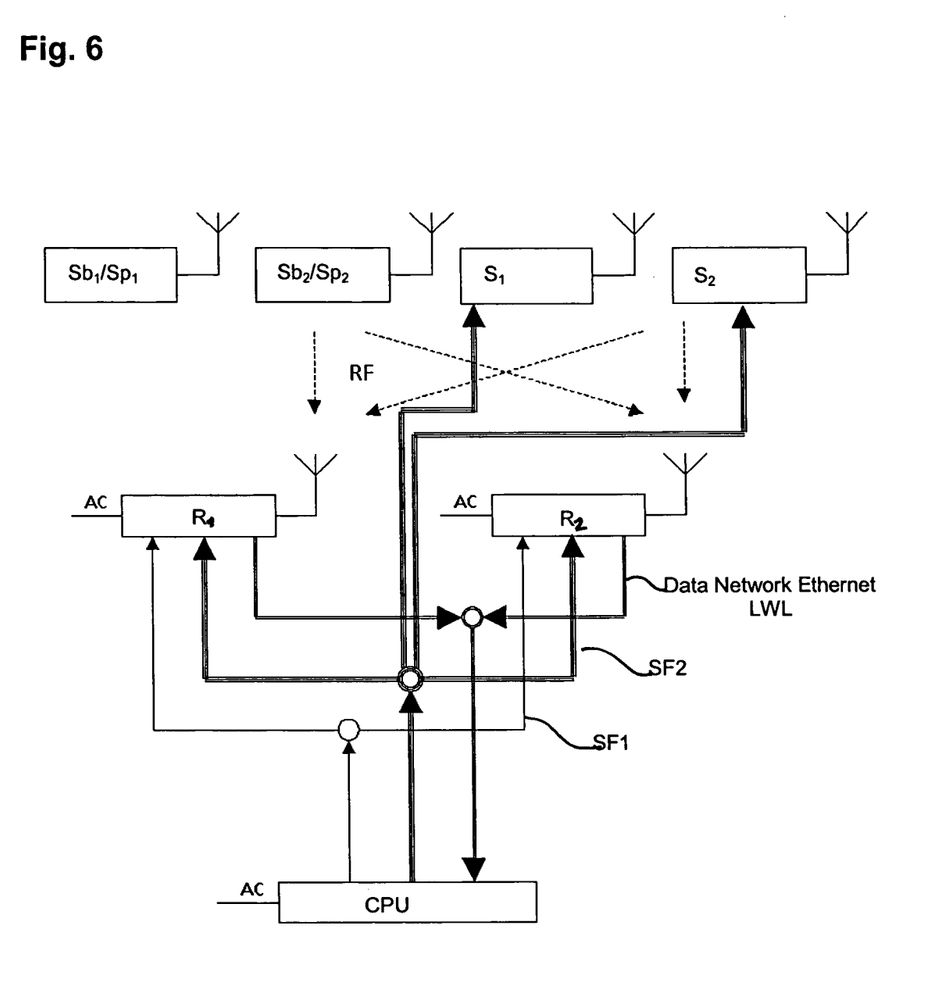
FIG. 6 is a diagram of the networks linking the transmitters and receivers.

At a transmission time point, each transmitter only sends a short burst transmission B which is detected by the receivers $E_1$–$E_n$. Stationary reference transmitters $R_1$ to $R_n$ respectively $Rx_1$ to $Rx_n$ in FIG. 3 serve as position references for minimizing errors and for calibrating the system. These transmit an identification code and signals, which are detected by receivers for the purposes of determining their transit time, in like manner to the at least one mobile transmitter Sb, Sp on the moving object. The reference signals are synchronized by means of a signal frequency SF2 of 250 MHz in the exemplary embodiment. Furthermore, the receivers of FIG. 6 are likewise synchronized with one another by means of a signal frequency SF1 of 25 MHz in the exemplary embodiment depicted in FIG. 6. Hereby, the receivers, which are arranged in a receiving network RN in accordance with FIG. 3, thus receive a first item of information over the clocking line 13, a timing mark over the line 14 and their power supply over the line 15. The data obtained by virtue of these items of information is conveyed together with the detected signals over the data line 17 to the data port DP of a central computer unit CPU so that the position of the mobile object can be determined from the signals conveyed thereto. Reference characters DPE designate a data processing and evaluation unit and reference characters SDD designate a signal/data distributor. The block $Rx_n$ besides of FIG. 3 shows a matrix, wherein $\delta tm_a$ is the time difference relative to the last timing mark for each receiver transmitter ID and wherein $am_n$ gives the information regarding the quality of the correlation for purposes of hard/soft decision in the controller. Before the game controller C calibrates the mutual transit times of the receivers Rx and synchronizes the receiver network RN. With the help of the controller C the position of the relative mutual transit times of the Rx is calculated.

At least four receivers are needed in order to locate an object in a three-dimensional space. Transit time differences are detected in the respective receivers. The geometrical solution in regard to the determination of the position can be obtained by solving a set of hyperbolic equations. The reference signals are distributed over cables, preferably, glass fiber cables. The mobile transmitter modules for the transmitters S, Sp, Sb emit time-limited transmission signals in the form of burst transmissions B. The burst transmissions B are sent using non synchronized pseudo-random patterns which are a combination of the access mechanisms, time division multiplex and code division multiplex, in order to thereby use the available bandwidth as fully as possible. For the purposes of reducing superimpositions, pseudo-random patterns are used which are preferably prime number sequences. Thereby, the smaller prime numbers are assigned to the faster moving transmitters, i.e. to the transmitter Sb in the ball in the exemplary embodiment, whilst the higher prime numbers are assigned to the more slowly moving transmitters Sp.

The separation of two random signals arriving simultaneously is effected by the receiver which tolerates undetected individual values for this purpose. This is possible due to the high pulse rate. The analogue reception signals received at the HF front end are digitized in an evaluating unit and the reception time points of the signals from the respective transmitters are determined in relation to the reference time point. For the processing of the received signals, the splitting up of the received signal into a plurality of signal sources (distinguishing the transmitters) and the characterization of the momentary path of movement for each transmitted signal, use is made of software operating with a certain methodology which incorporates several algorithms having variable parameters. These are adapted and combined interactively in dependence on the situation.

For the purposes of allowing the real time transmission process, the transmitter and receiver incorporate hardware with which the triggering time point for recording the data can be accurately detected. Furthermore, there is provided an evaluating unit incorporating digital hardware for the preparation of a synchronizing signal which is fed in over appropriate interfaces.

Figure 2:
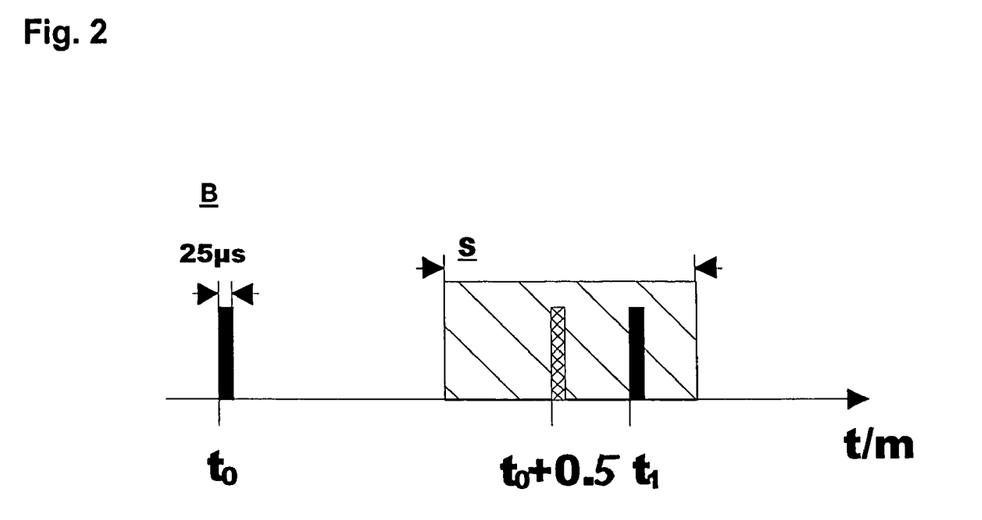
FIG. 2 illustrates the search range for the sampling of a burst transmission.

Important items of data are obtained in the configuration phase prior to the system switching over into its normal operating mode. This is necessary for the calibration of the system in order to take into account e.g. the transit time in the glass fiber network. Hereby, a system check is also carried out so as to detect possible problems in the various parts thereof such as the receivers. After this phase, the process of synchronizing with the transmitters is effected by means of the correlation function. Basically, the transmitters send temporally equidistant packets of data so as to enable an allocation process to occur. Thus, the synchronization routine must have once "found" a data packet for the respective transmitter whereafter it can then predict the next transmitting time point with a certain degree of accuracy since the transmission pattern is of course known. The trigger logic is controlled accordingly in order to enable the digitized data to be found again in the memory. On the basis of the position in the memory and the deviation from the reference time point determined in the correlation routine, the routine determines the distance data, commencing from the expected transmission time point $t_0$, utilizing a transit time calculation, in accordance with FIG. 2. A search range s within which the next signal must emerge is thereby obtained.

Algebraic methods for the solution of the navigation equations have the disadvantage that they deliver very variable and in many cases inadequate positional accuracy in dependence on the infrastructure, the geometry and the quality of the individual measurements obtained at the receivers. Consequently, algebraic algorithms are only used for initialization purposes and for monitoring other algorithms. A substantial improvement can be obtained by the use of averaging methods in dependence on the frequency of the positional calculations. Moreover, an additional optimization of the positional accuracy can be achieved by taking into consideration items of information regarding the quality of the stochastic measurement. In the concrete exemplary embodiment, use is made of the KALMAN filter which combines the two improvements indicated above and additionally permits the current situation to be taken into consideration (situation awareness) by the use of suitable models for the prediction of the movement.

In the special cases of highly dynamic situations of the object being tracked, e.g. when the ball bounces off the goal, then problems occur which have to be solved in a special manner. For the purposes of solving this problem, it is necessary to introduce additional algorithms for the acquisition of highly dynamic events. To this end, a comparison is made between the movement situation existing just before and just after the position under consideration. A decision can be made in regard to the dynamics of the situation by determining the differences between the two phases of movement (before, afterwards). An appropriate analysis of this situation can subsequently be accomplished therewith using a rotated time axis.

For the purposes of a further improvement in positional accuracy, methods for smoothing the curves of the individual spatial coordinates are used. On the one hand, algorithms are used which still fit within the real time framework of the system by tolerating a certain temporal delay. Here, smoothing of the curve is effected over certain ranges. In the case of a previously detected dynamic event, the method is adapted in dependence on the situation. In this case, smoothing of the curve is not effected beyond this dynamic time point, but rather, by approaching this time point from each side. The still missing, unsmoothed ranges can be filled by suitable interpolation algorithms of a logical or mathematical nature. A substantial improvement of the positional accuracy in the dynamic case is obtained as a result.

Insofar as it is necessary for optimizing these algorithms, there may be introduced between the space coordinates requiring smoothing a combination which will entail an increase in the certainty of detection of dynamic events.

If necessary, processing methods can subsequently be employed to which no temporal computing time restrictions apply and which could also be used externally. In comparison with algorithms that are adapted to be used in real time, these provide additional increased positional accuracy since larger ranges can be drawn upon for the process of smoothing the curve. In these cases too, it is ensured that the detected dynamic events will be taken into account in an appropriate manner.

The items of data are thus processed in the receiver in the following manner:

During the acquisition phase, the sequence of transmitting time points is synchronized. To this end, algorithms of reduced temporal resolution are used. The aim here is merely to estimate the time points of the future transmitting time points.

In the tracking mode, the burst transmissions are continuously detected with higher accuracy and the momentary position is calculated. The incoming signals are only evaluated at the estimated or previously calculated sending or reception time point. In addition, an estimate is made of the next transmitting time point.

As an option, data that was stored in the zoom mode could also be processed using additional algorithms. In the zoom mode, data can also be processed in e.g. reverse temporal order in order to e.g. step up to a discontinuity from both sides (e.g. a ball bounces off the goal posts).

Consequently, the receiver will detect the data using a high sampling frequency and then buffer store it. The relevant items of data are then subjected to further processing in correspondence with the estimated transmitting time points and, as an option, will continue to be stored in order to make them available for use e.g. in algorithms of the zoom mode.

The accuracy can be increased by means of a subsequent data processing operation and by the integration of external sensors e.g. acceleration sensors in the ball or by graphic data. The system supplies the positional data of every operational transmitter at e.g. 1-second intervals.

As an example, the 2.4 GHz band has been proposed for the transmission range, but other bands in the lower band ranges could, in principle, also be utilized in order to keep the current consumption low. However, it is also conceivable to use higher frequency ranges e.g. 5.8 GHz, 9.4 GHz, 24 GHz for lower distance ranges and higher distance resolution. Since the receivers detect the signals sent out by the transmitters and determine their transit time differences, they must be synchronized very precisely to one another, this being achievable by using a highly stable reference signal over the clocking line 13 and by the use of glass fiber cables in the exemplary embodiment. The receivers $E_1$–$E_n$ deliver the received items of data over a data network work to a central computer unit CPU which calculates the position of the individual transmitters therefrom and is responsible for the exchange and synchronization of the receiver data. These items of data consist of the transit time as well as an appraisal of the quality of the received signals. A feedback channel between the mobile transmitters S, Sp, Sb and the stationary receivers $E_1$–$E_n$ is not absolutely necessary for the localization process itself, but permits of an improvement in the positional determination process although, on the other hand, it would lead to an increase in the complexity of the system and thus the costs involved.

By virtue of the transmission process utilizing the principle of pseudo-random time division multiplex using orthogonal burst transmission and non synchronized pseudo-random patterns, it becomes possible for the receiver to clearly separate the signals. If two transmitters actually send out a signal at the same time, then the "unwanted transmitter" appears as noise. There will thus be at least signal-to-noise ratios which will enable the signal to be detected in a problem-free manner.

This concept has the advantage that the transmitters are only active for a short time, this thereby resulting in just a small current consumption. The transmitters do not have to be synchronized so that a receiver module can be dispensed with at the transmitter end whereby the transmitter is substantially simplified and is more robust. Due to the pseudo-random sequences in the form of prime numbers, the same transmitters will not always be superimposed during one transmission period so that the disadvantageous situation wherein a more distant transmitter is constantly smothered by a close transmitter can basically be avoided. Consequently, the "near-far" problem can be eliminated statistically. The probability of a collision of the burst transmissions B is reduced.

The transmitted signal can be described by the equation $$s(t)=g(t)e^{j(2\pi f t)}$$

wherein g(t) represents the baseband signal and f the carrier frequency. The received signal for the different receivers can be described by $$e_u(t)=h(t)\cdot(g(t-\tau)e^{j(2\pi f \cdot t-\tau)}$$

wherein h(t) represents the distortions in the transmission channel (absorption, frequency response, . . . ) and τ the transit time between the transmitter and the receiver.

The following methods can be considered for the determination of the transit time τ:

only the baseband signal g(t) is used.

the carrier phase is evaluated therewith.

If the carrier phase is to be evaluated therewith, the following situation arises:

The carrier frequency is approximately 2.4 GHz for the ISM band under consideration. This results in the periodic time being 0.4 ns. A carrier phase evaluation would thus possess an ambiguity of 0.4 ns. Thus, a carrier phase evaluation can only be drawn upon for the purposes of an increase in accuracy if an accuracy of better than 0.4 ns is obtainable by other methods.

The baseband signal in the receiver can be described by the equation $$e_u(t)=h(t)\cdot(g(t-\tau)e^{j(2\pi\Delta f\cdot t+\Phi u)}$$

wherein Δf represents the frequency offset if non synchronized oscillators are used in the transmitters. $\phi_u$ is the phase offset between the oscillators.

The transit time τ can be determined from the correlation $e_u(t)$ using the known transmission signal g(t). The accuracy of this correlation is a key parameter for the positional accuracy. The accuracy of the correlation is determined by the properties of the autocorrelation process for the signal, the methods which are used for the calculation of the correlation and the effects of interference.

In principle, the problem affecting the accuracy could be the multi-path propagation process and/or absorption in the body that can arise as a result of signals which are not supplied to the receiver either directly or after reflection from their objects. Consequently, the earliest one of the incoming signals must be used in the receivers $E_1$–$E_n$ for the distance calculation even though it may not be the strongest. This is facilitated in the concrete exemplary embodiment by virtue of the fact that the temporal separations of the burst transmissions from all the transmitters are known in the receivers and thus, to an approximation, the time point at which the transmission signals are "expected" in the receiver is also known.

A burst transmission B lasts 25 μs, wherein a guard period of 5 μs is included to allow for the process of switching the transmitter output stage on and off. The transmitter ID sequence lasts 15 μs and contains 750 bits. The remaining 5 μs carries 250 bits of information as data. This thus results in a data rate of 50 Megabit per second. Consequently, in the case of the exemplarily available overall bandwidth of 80 MHz in the ISM band at 2.4 GHz, this results in a roll-off factor of α=0.6 in the baseband filtering system for the HF transmission of the bit sequences. A burst repetition frequency of 0.5 ms is planned for the ball, whilst the transmitters used by the players have a repetition frequency of 4 ms. A utilization time of 67.5% results therefrom. Apart from an asynchronous control of the transmitters governed by random sequences, this also enables synchronized control of the transmitters to be effected via a HF feedback channel should this be necessary, although with the aforesaid disadvantages. In end effect, there is a resulting minimum positional resolution per burst transmission of up to 20 mm in the case of a ball and of up to 44 mm for a player's transmitter.

Figure 7:
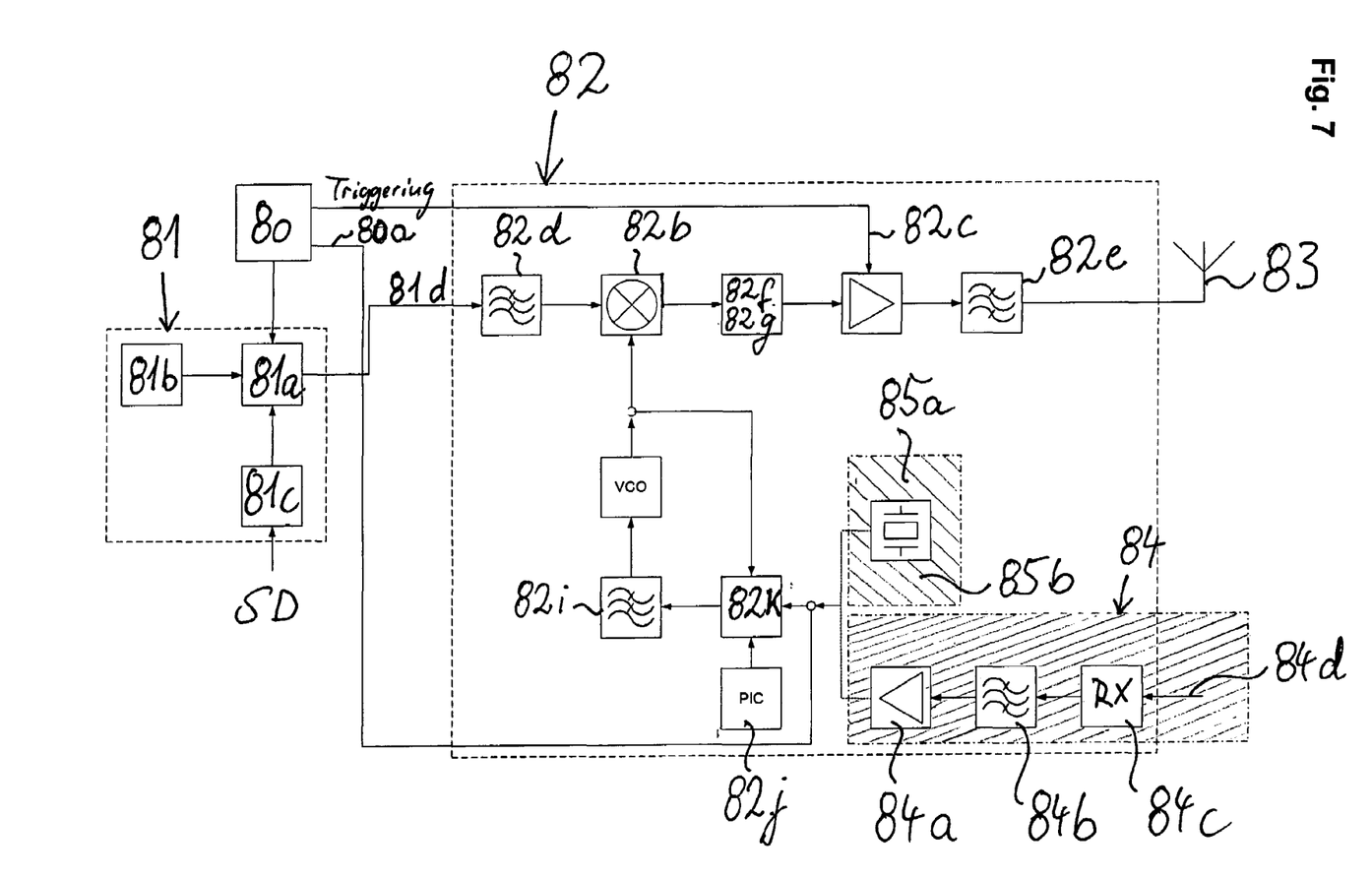
FIG. 7 is a schematic illustration of the generation of a burst transmission.

FIG. 7 shows a block diagram of the transmitter module. The module consists of a timing control unit 80, a data transmission generating unit 81 and a burst transmission generating unit 82. The timing control unit 80 controls the temporal operational sequences in the circuit. It receives the system clock pulses from the burst transmission generating unit 82 and, for its part, it triggers both the data transmission generating unit 81 and the burst transmission generating unit 82. The items of data for the transmission are generated in the data transmission unit generating 81, whereby sensor data can also be processed therewith. The items of data are then modulated onto a high frequency carrier in the burst transmission generating unit 82. The radiation of the burst transmission is effected via the antenna 83.

The data transmission generating unit 81 consists of the data burst production unit 81a, the transmitter ID block 81b and the sensor data preparation unit 81c. The data burst production unit 81a processes the sensor data supplied by the sensor data preparation unit 81c with the transmitter identifier from the transmitter ID block 81b which represents a bit sequence specific to each transmitter. The resultant data burst is passed on to the burst transmission generating unit 82. In the case of the ball transmitter, the sensor data comes from an acceleration sensor whilst in the case of the player's transmitter it may contain e.g. medical data. The burst transmission generating unit 82 includes the reference oscillator, the high frequency generating unit, the modulator 82b as well as the output stage 82c. The items of transmission data are initially filtered by means of a data filter 82d in order to reduce the bandwidth and thereby enable them to be modulated by the modulator 82b onto the high frequency carrier. After the BPSK modulation process, the signal is amplified and subsequently filtered in the bandpass filter 82e in order to suppress spurious emissions. The burst transmission is finally radiated via the antenna 83. The timing control unit 80 controls the temporal generation of the data burst and the switching of the output stage 82c according to time division multiplex techniques. The clock pulse generation is correlated with the reference transmitter 84 receiving the synchronization clock pulse 84d and comprising a glass fiber receiver 84c, filter and clock signal processing unit 84d and an amplifier 84a and with the transmitter Sp,Sb including quartz oscillator 85a and a transistor in a quartz unit 85b. The clock signal is also influencing the modulator 82b via PIC 82j, PD & Divider 82k, and loop filter 82i including a low pass filter. Reference number 82f designates a level adjustment unit and reference number 82g designates resistors.

Figure 8:
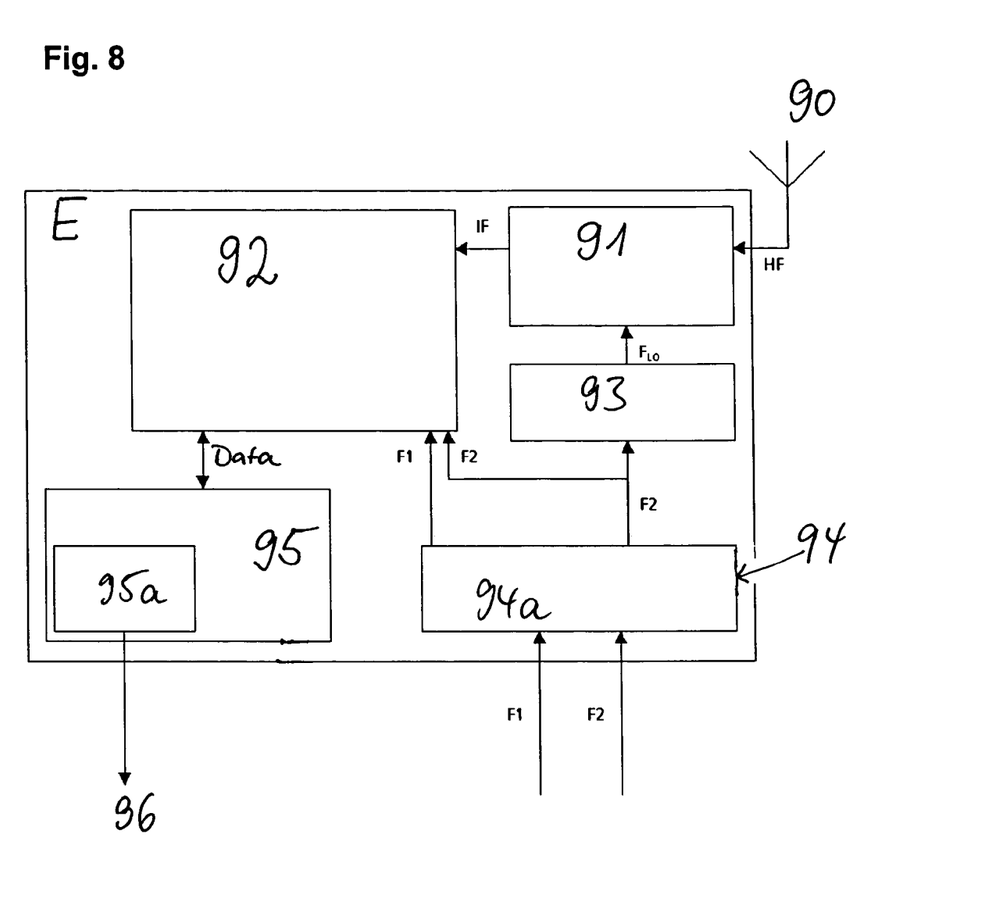
FIG. 8 is a schematic illustration of a receiver.

FIG. 8 shows the functional blocks of a receiver E. High frequency signals received over the antenna 90 are converted to an intermediate frequency and digitized there with the help of an A/D converter. The digital processing unit 95 obtains therefrom the temporal spacings of the received transmission signals from the individual transmitters with reference to the synchronizing pulses which are distributed by the receiver block 94 containing an LWL receiver to all the components in the receiver E. In addition, the "raw transit time data" generated in this manner is provided with a quality criterion which incorporates the received field strength or the validity of the corresponding measured value before it is passed on to the central computer. The received radio signals are amplified by a low-noise amplifier before they are band-pass filtered. After repeated amplification and filtering processes, mixing takes place in the intermediate frequency range. Since the digitization process is effected by sub-sampling, yet another filtering process must be carried out before a variable amplification process which provides for a constant level in the A/D converter. The two synchronizing signals are then passed on to the digital signal processing unit as clock pulses, whereby a sampling frequency in the form of the 20 MHz clock pulse SF2 is also supplied to the A/D converter . The digital processing unit contains a network card 95a for submitting the data rate as transit time data 96. A frequency multiplier is arranged between the LWL receiver 94a and the HF-section 91. Reference number 90 designates an antenna, reference number 91 designates a high frequency section, and reference number 93 designates a frequency multiplier.

A sampling rate of approximately 200 MHz is used in view of the high bandwidth. In the base band section 92 of the respective receivers, the supplied sampling values are stored first in a memory having a ring-buffer type structure. In order to synchronize to the transmission signals, one initially looks for the known transmission periods in the received signal and then carries out the correlation with the transmission pattern at predicted places in the memory. This leads to an exact determination of the receiving time point. A plurality of the computing units, which are necessary for the correlation process for both the ball and the players, is provided in parallel. These are informed of the transmission patterns that are to be sought-for by the central computer. It must be ensured hereby that all the signals can still be evaluated even in the event of an unfavorable constellation. The receiving time point for the respectively evaluated transmitter signals is derived from the correlation units together with a quality mark—for assessing the quality of the measured value—which is transmitted to the central computer CPU via the controlling PC and via the data network infrastructure.

All the measured values from the receivers (transmitter time point, receiving time point, quality mark) are gathered together in the central processor CPU. They are sorted and arranged in groups with the help of the transmitter identification numbers so that the calculation of the position can then be effected for each transmitter using the appropriate algorithms. The coordinates obtained in this way can then be extracted via a defined interface and then further evaluated.

Since the determination of the position is effected using a very precise measurement of the difference in transit times of the transmission signals to the receivers, two reference signals are required, these being generated centrally at a location in the system, e.g. in the central computer CPU and distributed to all the receivers as well as to the central computer. The frequencies of the two necessary frequency signals may lie in the range of e.g. 15–25 MHz and 150–250 MHz. The signals are implemented as square wave signals in order to obtain unambiguous timing marks, and they are supplied to the receivers over the line 14.

The reference transmitters $R_1$–$R_n$ work with trigger and clock pulse signals which are fed in from the signal network. The receivers are preferably straight receivers which work at the synchronization frequencies. The receivers could, however, be in the form of simple superhet-receivers. Thereby, an intermediate frequency is used which must then be mixed in a second mixer stage with the output frequency but low-pass-filtering must still be effected. The advantage of this arrangement is the completely free choice in regard to the output frequency. With a given bandwidth of 80 MHz, this would entail a theoretical sampling rate of 160 MHz. However, the bandwidth is effectively determined by the analogue pre-filter having a characteristic transfer function.

It is self-evident that this description may be subjected to modifications, changes and adjustments of the most diverse nature which would lead, in the sense of falling within the range of equivalents, to the attached claims.

The invention claimed is:

1. A method for the continuous real time tracking of the position of a plurality of mobile objects in a defined multi-dimensional space, comprising:

attaching transmitter modules to the mobile objects;

receiving signals from the transmitter modules by a stationary receiving and signal processing network; and processing the received signals centrally, wherein the signals emitted by the transmitter modules are electromagnetic waves which are transmitted within a frequency band that is used as a single channel without a feedback channel, wherein a communication process between the transmitter modules and receivers of the receiving and signal processing network is based on a principle of pseudo-random time division multiplexing using non synchronized pseudo-random patterns, such that each transmitter module emits a characteristic transmission pattern having a sequence of burst transmissions that occur at pseudo-random times, wherein the burst transmissions are characterized by a low cross correlation, so that there is a low probability of transmitting burst transmissions at the same time, and wherein the characteristic transmission patterns of the transmitter modules are already known to the receiving and signal processing network, and after each burst transmission from a transmitter module is received by the receivers, the receiving and signal processing network calculates a search range for each receiver during which the next burst transmission of the characteristic transmission pattern of the same transmitter module is expected to arrive, the search range having a duration that is substantially longer than the duration of the burst transmissions.

2. A method in accordance with claim 1, wherein the principle of pseudo-random time division multiplexing comprises a process of transmitting at isolated, irregular time points.

3. A method in accordance with claim 1, wherein the receiving and signal processing network estimates the time point of the next burst transmission from each transmitter module.

4. A method in accordance with claim 1, wherein only those burst transmissions are evaluated by the receiving and signal processing network which arrive at the receivers during the search ranges.

5. A method in accordance with claim 3, wherein the next burst transmission from each transmitter module is determined continuously.

6. A method in accordance with claim 1, wherein the transmitter modules are miniaturized, at least one of the transmitter modules being small enough to be inserted into a ball.

7. A method in accordance with claim 1, wherein the frequency band lies at approximately 2.4 GHz.

8. A method in accordance with claim 1, wherein the frequency band has a bandwidth of about 80 MHz.

9. A method in accordance with claim 1, wherein the receiving and signal processing network comprises stationary reference transmitters that are used as position references for the purposes of minimizing errors and for calibration of the positions of the transmitter modules, said reference transmitters transmitting an identification code in a sequence, the signals from said reference transmitters being detected by the receivers of the receiving and signal processing network for purposes of determining their time of arrival at the respective receivers.

10. A method in accordance with claim 1, wherein the characteristic transmission patterns are a combination of access mechanisms, time division multiplexing, and code division multiplexing.

11. A method in accordance with claim 1, wherein the characteristic transmission patterns are prime number sequences.

12. A method in accordance with claim 1, wherein in the case of the burst transmissions a separation of at least two signals of different origin arriving randomly at the same time is effected by a receiver of the receiving and signal processing network.

13. A method in accordance with claim 1, wherein the burst transmissions are transmitted at a pulse rate which is so high that undetected individual values are tolerated.

14. A method in accordance with claim 1, wherein the receiving and signal processing network comprises means for receiving analog signals, digitizing the received signals, and determining and storing time points, at which the signals from respective transmitter modules are received.

15. A method in accordance with claim 1, wherein different algorithms can be used by the receiving and signal processing network for the processing of received and stored signals in different situations.

16. A method in accordance with claim 15, wherein the receiving and signal processing network comprises means for dividing received signals into sections for processing of the received signals, and the best respective algorithm or a plurality of algorithms are used simultaneously for the individual sections.

17. A method in accordance with claim 15, wherein the receiving and signal processing network comprises means for dividing received signals into sections for processing of the received signals, and a rotated time axis is also used for individual sections so that discontinuities in highly dynamic processes are approached from two sides.

18. A system for transmitting electromagnetic waves for use in a method for continuous real time tracking of the position of mobile objects in a defined multidimensional space, comprising:

a plurality of transmitter modules which are attached to the mobile objects; and a stationary receiving and signal processing network for receiving and processing signals transmitted by the transmitter modules, said signals being waves which are transmitted in a frequency band that is used as a single channel without a feedback channel, wherein a communication process between the transmitter modules and receivers of the receiving and signal processing network is based on a principle of pseudo-random time division multiplexing with non synchronized pseudo-random patterns, such that each transmitter module emits a characteristic transmission pattern having a sequence of burst transmissions that occur at pseudo-random times, wherein the burst transmissions have a low cross correlation, so that there is a low probability of transmitting burst transmissions at the same time, and wherein the characteristic transmission patterns of the transmission modules is already known to the receiving and signal processing network, and after each burst transmission from a transmitter module is received by the receivers, the receiving and signal processing network calculates a search range for each receiver during which the next burst transmission of the characteristic transmission pattern of the same transmitter module is expected to arrive, the search range having a duration that is substantially longer than the duration of the burst transmissions.

19. A method for the continuous real time tracking of the position of a mobile object, comprising:

attaching a mobile transmitter module to the mobile object;

placing at least one reference transmitter module at at least one known position; and receiving signals emitted by the transmitter modules with a plurality of receivers of a receiving and signal processing network, wherein an available frequency band is used as a single channel without a feedback channel;

wherein a communication process between the receivers and the mobile transmitter module is based on a principle of pseudo-random time division multiplexing using non synchronized pseudo-random patterns, such that the mobile transmitter module emits a characteristic transmission pattern having a sequence of burst transmissions that occur at pseudo-random times, and wherein the characteristic transmission pattern of the mobile transmitter module is already known to the receiving and signal processing network, and after each burst transmission from the mobile transmitter module is received by the receivers, the receiving and signal processing network calculates a search range for each receiver during which the next burst transmission of the characteristic transmission pattern of the mobile transmitter module is expected to arrive, the search range having a duration that is substantially longer than the duration of the burst transmissions.

20. A method for the continuous real time tracking of the position of a mobile object in a defined multidimensional space in which-at least one transmitter module is disposed, comprising:

attaching said at least one transmitter module to the mobile object;

receiving signals from the at least one transmitter module by a stationary receiving and signal processing network; and processing the received signals centrally, wherein the signals emitted by the at least one transmitter module are electromagnetic waves which are transmitted within a frequency band that is used as a single channel without a feedback channel, wherein a communication process between the at least one transmitter module and receivers of the receiving and signal processing network is based on a principle of pseudo-random time division multiplexing using non synchronized pseudo-random patterns, such that each at least one transmitter module emits a characteristic transmission pattern having a sequence of burst transmissions that occur at pseudo-random times, wherein the burst transmissions are characterized by a low cross correlation, so that there is a low probability of transmitting burst transmissions at the same time, and wherein the characteristic transmission pattern of the at least one transmitter module is already known to the receiving and signal processing network, and after each burst transmission from a transmitter module is received by the receivers, the receiving and signal processing network calculates a search range for each receiver during which the next burst transmission of the characteristic transmission pattern of the same transmitter module is expected to arrive, the search range having a duration that is substantially longer than the duration of the burst transmissions.

21. A method for the continuous real time tracking of the position of a mobile object in a defined multidimensional space in which a plurality of transmitter modules are disposed, comprising:

attaching one of said transmitter modules to the mobile object;

receiving signals from the transmitter modules by a stationary receiving and signal processing network; and processing the received signals centrally, wherein the signals emitted by the transmitter modules are electromagnetic waves which are transmitted within a frequency band that is used as a single channel without a feedback channel, wherein a communication process between the transmitter modules and receivers of the receiving and signal processing network is based on a principle of pseudo-random time division multiplexing using non synchronized pseudo-random patterns, such that each transmitter emits a characteristic transmission pattern having a sequence of burst transmissions that occur at pseudo-random times, wherein the burst transmissions are characterized by a low cross correlation, so that there is a low probability of transmitting burst transmissions at the same time, and wherein the characteristic transmission patterns of the transmitter modules is already known to the receiving and signal processing network, and after each burst transmission from a transmitter module is received by the receivers, the receiving and signal processing network calculates a search range for each receiver during which the next burst transmission of the characteristic transmission pattern of the same transmitter module is expected to arrive, the search range having a duration that is substantially longer than the duration of the burst transmissions.

* * * * *